United States Patent [19]

Tappe

[11] Patent Number: 4,912,151

[45] Date of Patent: Mar. 27, 1990

[54] METHOD OF MANUFACTURING POURABLE PULVERULENT RUBBER-FILLER MIXTURES STARTING WITH RUBBER SOLUTIONS

[75] Inventor: Ralf Tappe, Dorsten, Fed. Rep. of Germany

[73] Assignee: Huels Aktiengesellschaft, Marl, Fed. Rep. of Germany

[21] Appl. No.: 302,953

[22] Filed: Jan. 30, 1989

[30] Foreign Application Priority Data

Mar. 23, 1988 [DE] Fed. Rep. of Germany ....... 3809710

[51] Int. Cl.$^4$ ................................................ C08L 9/00
[52] U.S. Cl. .................................... 524/571; 523/333; 523/334
[58] Field of Search ................. 524/571; 523/334, 333

[56] References Cited

U.S. PATENT DOCUMENTS 4,250,082 2/1981 Sommer et al. ................. 524/571

Primary Examiner—Joseph L. Schofer
Assistant Examiner—Mark D. Sweet
Attorney, Agent, or Firm—Oblon, Spivak, McClelland, Maier & Neustadt

[57] ABSTRACT

A method for manufacturing pourable pulverulent rubber-filler mixtures starting from rubber solutions is disclosed. In this method, the filler is dispersed in an organic solvent and then mixed with a rubber solution to obtain a stable rubber-containing filler dispersion. The dispersion is then introduced into hot water containing a dispersed filler and subjected to high shear forces, causing the organic solvent to simultaneously be largely distilled off. After the rubber-containing filler dispersion has been completely added, an aqueous filler dispersion is added, water is removed from the precipitated rubber-filler mixture, and the product mixture is dried under constant agitation.

14 Claims, No Drawings

METHOD OF MANUFACTURING POURABLE PULVERULENT RUBBER-FILLER MIXTURES STARTING WITH RUBBER SOLUTIONS

BACKGROUND OF THE INVENTION

1. Field of the Invention

The present invention relates to the manufacture of pourable pulverulent rubber-filled mixtures starting with rubber solutions.

2. Discussion of the Background

In contrast to the manufacturing of molded pieces from thermoplastic materials, the processing of raw rubber material to manufactured rubber articles requires a complex production system which is costly in terms of time, energy, and personnel.

The pulverization of the raw rubber which is supplied in the form of balls, and the mixing with fillers, mineral oil softening agents, and vulcanization accelerators is accomplished on rolls or in kneader-mixers. Because of the frictional heat which develops, the mixing process must be carried out discontinuously, in a plurality of stages, where special requirements apply to the intermediate storage of the mixtures. After the possibly necessary step of processing with calenders or extruders, the final stage is carried out, which is vulcanization in presses or autoclaves.

To sidestep this costly and complex rubber processing, it has been proposed to use pourable filler-containing rubber powders. Using such powders, one can readily produce mixtures of rubber with, e.g., thermoplastic plastic powders, in a rapid and quasi-process.

Methods of producing pourable pulverulent mixtures of rubber and filler have been known for a number of years, particularly methods of producing mixtures of rubber and carbon black based on all-purpose rubbers (German Pat. No. 2,135,266, German AS No. 22 14 121, German OSs Nos. 23 24 009, 23 25 550, and 23 32 796, and German Pat. Nos. 2,439,237, 2,654,358, 2,822,148).

According to the state of the art methods described in these publications, pulverulent, filler-containing rubbers (so-called powdered rubbers) can be produced from rubber emulsions and rubber solutions, with the use of emulsifiers (cationic, anionic, or nonionic surface-active substances) and various precipitation aids (acids, metal salts, protective colloids, etc.), in single-stage or multi-stage processes.

However, these techniques have certain drawbacks from an economic, ecological, and process engineering standpoint. These include:

1. Use of costly chemicals, e.g., quaternary ammonium salts or alkylamine alkoxylates;
2. Environmental pollution via electrolyte-containing waste waters;
3. Use of costly precipitation techniques, e.g., maintenance of pH within specified ranges;
4. Corrosion problems when acid precipitation media are used, which may lead to costly production downtime.

Other drawbacks include the use of appreciable amounts of emulsifiers and precipitation aids which become mixed into the rubber, where they can have a detrimental effect on various product characteristics.

There have been past attempts to produce a base mixture from a polymer and carbon black (German OS Nos. 21 47 429) by mixing a slurry of carbon black in an aqueous or organic solvent with a solution of the polymer in an inert organic solvent, and bringing this mixture into intimate contact with a gas stream of a temperature and speed such that the mixture is sucked up and dried, and the resulting base mixture is separated out. According to another state of the art method (German OS No. 21 54 422), a part of the volatile materials contained in a liquid mixture of an elastomer is converted to vapor in a flash evaporation step. Both of these methods result in crumbly, non-pourable products.

Finally, in the method according to German OS No. 22 60 340, a rubber solution obtained by polymerizing butadiene or copolymerizing butadiene with styrene in the presence of lithium catalysts is mixed with a filler dispersion. This flowable mixture is preferably heated to 100°–200° C., and then subjected to a pressure drop from relatively high to relatively low pressure, causing the organic liquid to undergo flash evaporation and the rubber-filler mixture precipitates out as a pourable, non-caking powder. This process is particularly suitable for processing hot rubber solutions obtained in adiabatic polymerizations. Where, after the polymerization reaction, the filler dispersion and rubber solution must be suitably heated, this method is not advantageous, because of the energy costs incurred and because of the additional thermal insult to the rubber.

In view of the stated disadvantages in the state of the art methods, there is a clear need for a method of producing pourable pulverulent filler-containing rubber, which is simple and inexpensive and excludes (and does not introduce) undesirable foreign substances.

SUMMARY OF THE INVENTION

Accordingly, it is an object of this invention to provide a simple method for producing a pourable pulverulent filler-containing rubber.

It is another object of this invention to provide an inexpensive method for producing a pourable pulverulent filler-containing rubber.

It is yet another object of this invention to provide a method for producing a pourable pulverulent filler-containing rubber, which method excludes and does not introduce undesirable foreign substances in the rubber product.

The inventor has now discovered a method which satisfies these objects and other objects which will become apparent from the description of the invention given below. In this method a pourable pulverulent rubber-filler mixture is produced by combining a filler dispersion with a rubber solution, precipitating and drying the rubber-filler mixture.

The present method is characterized in that the filler is dispersed in an organic solvent. This dispersion is mixed with a rubber solution, and the resulting stable rubber-containing filler dispersion is introduced into hot water, containing dispersed filler and subjected to high shear forces. In this operational step the organic solvent is simultaneously distilled off, to the extent possible. After the rubber-containing filler dispersion has been completely added, an aqueous filler dispersion is added, water is removed from the precipitated rubber-filler mixture, and the product mixture is dried under constant agitation.

DETAILED DESCRIPTION OF THE PREFERRED EMBODIMENTS

In a preferred embodiment, simultaneously with the addition of the rubber-containing filler dispersion, an aqueous, rubber-free filler dispersion is added to the precipitation bath, and the bath is subjected to high shear forces.

The temperature of the hot water lies in the neighborhood of the boiling point of the organic solvent used, and preferably the temperature is above the boiling point of the solvent. Thus with pentane which has a boiling point of 36° C., the hot water temperature may be from 40° to 45° C. With hexane which has a boiling point of 69° C., the temperature of the hot water may be from 75° to 95° C. With heptane which has a boiling point of 98° C., the temperature of the hot water may be about 100° C. With benzene which has a boiling point of 78° C., the temperature of the hot water may be from 85° to 95° C. Thus, generally, the temperature of the hot water is at a temperature corresponding to about the boiling point of the organic solvent used to a temperature 26° C. higher than the boiling point of the organic solvent used.

The rubber solutions used in the present method are preferably those arising in the solution polymerization of dienes, alone or in combination with vinylaromatic compounds, according to known methods in the state of the art. These solutions are, e.g., solutions of polybutadienes, polyisoprenes, polymethyl pentadienes, butadiene/styrene copolymers, butadiene/isoprene copolymers, isoprene copolymers, isoprene/styrene copolymers, butadiene/isoprene/styrene terpolymers, ethylene/propylene/diene terpolymers, and polyalkenylenes produced by the ring-opening polymerization of cycloolefins (e.g $C_5$ and $C_{7-12}$ cycloolefins).

As initiators in these solution polymerizations, organometallic compounds are used, chosen in accordance with the monomers and the properties of the rubber. These may be, e.g., Ziegler catalysts, lithium catalysts, or alfin catalysts.

Suitable solvents, used in the solution polymerization or for dissolving a rubber not obtained by solution polymerization, include, particularly, aliphatic, alicyclic, or aromatic hydrocarbons with a boiling point <100° C., e.g., pentane, hexane, heptane, cyclohexane, or benzene. Solvents with a boiling point <100° C. may also be used, e.g., toluene, if the precipitation of the rubber-filler mixture is carried out under an appropriate vacuum and with after supply of the water distilled off with the solvent.

According to the invention, pulverulent filler-containing rubbers can be produced which contain not just one rubber but mixtures of two or more rubbers. For such cases, either the solutions of different rubbers are mixed together or a plurality of rubbers is dissolved in a single solvent or solvent mixture.

The rubbers used in the inventive method are preferably rubbers dissolved in one of the above-mentioned solvents. In particular, a solution occurring after termination of polymerization and stabilization may be used.

The solids content of the rubber solutions used in the method is generally 5-25 wt. %.

Preferred candidates for the fillers are carbon blacks of the types (and all degrees of activity) commonly used in the rubber industry, e.g., SAF, ISAF, and HAF carbon blacks, and FEF, GPF, SPF, ARF, and MT modified carbon blacks. Mineral substances, e.g., silicon dioxide ($SiO_2$) or silicic acid, may also be incorporated into the mixture.

The amounts of carbon black or mineral fillers used may be 30-300 parts by weight per 100 parts by weight rubber (pph), preferably 50-150 pph.

To produce the rubber-containing filler dispersion, part of the filler amount provided for the final product, said part being generally 40-95%, is slurried in one of the above-mentioned solvents, preferably the rubber solvent, and a dispersion is produced therein with the aid of an ordinary commercial dispersing apparatus (e.g., Ultra-Turrax ®). The operation in the apparatus is continued until the filler particles have mean particle diameter <20 micron.

The stable, storage-stable, rubber-containing filler dispersion is obtained by mixing the rubber solution and the filler dispersion, under-stirring Rubber-containing filler dispersions suitable for the inventive method are dispersions which contain 2-30 wt. % rubber, preferably 5-13 wt. %.

Prior to the precipitation of the rubber-filler mixture, a further part of the filler amount provided for the final product, said part being generally 3-50%, is dispersed in an amount of water such that an aqueous 0.001-0.5% filler dispersion is produced for use as a precipitation bath.

To precipitate the rubber-filler mixture and separate out the organic solvent, the rubber-containing filler dispersion (alone or with an aqueous filler dispersion) containing up to 50% of the total amount of filler is added to the heated precipitation bath. Prior to and during the precipitation process, the temperature is maintained near the boiling point(s) of the organic solvent(s) to be removed. The precipitation bath is stirred with a high-shear rotor-stator stirring system (e.g., Ultra-Turrax ®) to optimally distribute the rubber-containing filler dispersion in the precipitation medium and thereby achieve rapid evaporation of the organic solvent.

The rotations per minute (rpm) of the rotor-stator system determines the particle size distribution in the resulting pourable rubber-filler mixture. A critical factor in the effectiveness of dispersion is the shear gradient. In a rotor-stator system this variable can be varied by varying the circumferential speed and the gap width. With a gap width of 2 mm, the optimal circumferential speed is in the range of 5-20 m sec$^{-1}$.

After addition of the rubber-containing filler dispersion to the precipitation bath, an aqueous filler dispersion is added which contains 2-10% of the total amount of the filler. Then advantageously the entire mixture is stirred for a period up to 20 min at a temperature above the boiling point of the solvent (or solvent mixture) employed. The precipitation bath is then cooled, preferably to 20°-30° C., water is removed from the rubber-filler mixture, e.g., by filtration, and the mixture is dried with constant agitation.

The inventive method enables production of pourable filler-containing rubber powders in a particularly simple manner. These powders can serve as the basis for vulcanizable mixtures and vulcanized final products, produced in later steps, which products may be, e.g., tire treads or sealing profiles.

Having generally described this invention, a further understanding can be obtained by reference to certain specific examples which are provided herein for purposes of illustration only and are not intended to be limiting unless otherwise specified.

Unless otherwise specified, all percentage data provided below are in units of weight percent.

Example 1

The rubber employed was an ethylene/propylene/ethylidenenorbornene terpolymer (Buna® AP 341, supplied by Bunawerke Huels GmbH), in the form of a 14.3% solution in hexane. 1,050 g of this rubber solution was first stirred together with a filler dispersion produced by running 60 g (40 pph) carbon black (Corax® N 539) and 440 g hexane for 10 minutes in a dispersion apparatus ("dispersed 10 min").

To produce an aqueous filler dispersion, an additional 15 g (10 pph) carbon black was dispersed 10 min. in 205 g water. Into a 7-liter precipitation container with stirrer, dropping funnel, and distillation bridge, 4 kg water and 110 g of the aqueous carbon black dispersion (5 pph filler) were charged, and the mixture was heated to 30° C. over a water bath. For precipitating the rubber-filler mixture, the previously prepared rubber-containing carbon black dispersion was allowed to flow into the precipitation bath continuously over 2 hr via a dropping funnel. During the precipitation process, a rotor-stator stirrer (Ultra-Turrax®, with gap width 2 mm) was operated in the precipitation bath, at 4,000 rpm. The precipitation temperature was maintained between 75° and 80° C. Then the remaining 110 g of the aqueous carbon black dispersion (5 pph filler) was fed into the precipitation bath.

To further separate out the hexane used as solvent, the entire mixture was heated to 85° C. for 15 minutes and then was cooled to room temperature (c. 22° C.) over a period of 30 min with the rotor-stator stirrer at 1,000 rpm. The water was then removed from the precipitated product by filtration, and the product was dried in a fluidized bed c. 2 hr at 40° C. A pourable pulverulent rubber-filler mixture was obtained.

EXAMPLES 2 to 8

Additional pourable pulverulent rubber-filler mixtures were produced by the method of Example 1, with variations solely in the type and amount of ingredients, and in some cases their distribution in the individual materials streams.

The following rubbers (K1–K4) were employed in hexane solution:

K1: An ethylene/propylene/ethylidenenorbornene terpolymer (Buna® AP 341), with Mooney viscosity (ML 1+4 at 100° C.) 70.

K2: A polybutadiene (Buna®VI), with 50% vinyl content.

K3: A butadiene/isoprene/styrene block polymer (Vestogral®), with Block A comprising 60 units butadiene, and Block B comprising 13 units butadiene, 16 units isoprene, and 11 units styrene.

K4: A polyisoprene (Vestogrip®), with 60% vinyl content.

The following fillers (F1–F3) were employed:
F1: Corax® N 539.
F2: Corax® N 339.
F3: Corax® N 234.

The individual characteristic process parameters are summarized in the following Table:

TABLE

| Example No. | Type of Rubber | Type of Filler | Wt. of rub. sol. (g) | % of rub. in rub. sol. (%) | Filler-Dispersion Hexane (g) | Filler-Dispersion Filler (g) | Aqueous Filler Dispersion Water (g) | Aqueous Filler Dispersion Filler (g) | Distribution of the Aqueous Filler-Dispersion Vessel (g) | Distribution of the Aqueous Filler-Dispersion Fed subsequently (g) |
| --- | --- | --- | --- | --- | --- | --- | --- | --- | --- | --- |
| 2 | K1 | F1 | 1,050 | 14.3 | 1,200 | 165 | 105 | 15 | 60 | 60 |
| 3 | K2 | F2 | 761 | 19.7 | 760 | 90 | 205 | 15 | 110 | 110 |
| 4 | K2 | F2 | 259 | 19.3 | 1,315 | 135 | 385 | 15 | 200 | 200 |
| 5 | K3 | F1 | 424 | 17.7 | 220 | 30 | 180 | 7.5 | 94.5 | 93 |
| 6 | K3 | F2 | 424 | 17.7 | 200 | 15 | 200 | 7.5 | 104.5 | 103 |
| 7 | K4 | F2 | 401 | 18.7 | 250 | 23 | 280 | 22 | 250 | 52 |
| 8 | K4 | F3 | 802 | 18.7 | 1,310 | 165 | 205 | 15 | 110 | 110 |

EXAMPLE 9

The rubber used was a polyisoprene produced by solution polymerization (Li catalysis) and having a vinyl content of c. 60% (viz., Vestogrip®), in an 18.7% solution in hexane. 401 g of this rubber solution were stirred together with a filler dispersion obtained by 10 min dispersion of 22.5 g (30 pph) carbon black (Corax® N 339).

An aqueous filler dispersion was prepared by dispersing 22.5 g (30 pph) carbon black in 280 g water for 10 minutes into a 7-liter precipitation container with stirrer, dropping funnel, and distillation bridge, 4 kg water and 50 g of the aqueous carbon black dispersion (5 pph filler) was charged, and the mixture was heated to 80° C. Then the rubber-containing carbon black dispersion and 202.5 g of the aqueous carbon black dispersion (20 pph filler) was allowed to flow into the precipitation bath simultaneously but in separate streams, over a period of 2 hr. During the precipitation process, a rotor-stator stirrer (Ultra-Turrax®, with gap width 2 mm) was operated in the precipitation bath, at 4,000 rpm. The precipitation temperature was maintained between 75° and 80° C. Then 50 g of the aqueous carbon black dispersion was fed.

To further separate out the hexane used as solvent, the entire mixture was heated to 85° C. for 15 minutes and then was cooled to room temperature over a period of 30 minutes with the rotor-stator stirrer at 1,000 rpm. The water was then removed from the precipitated product by filtration, and the product was dried in a fluidized bed c. 2 hr at 40° C. A pourable pulverulent mixture of polyisoprene and carbon black was obtained.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for producing a pourable pulverulent rubber-filler mixture, comprising:
   (a) dispersing a filler in a first organic solvent to obtain a dispersion;
   (b) combining said dispersion with a rubber solution, which contains a second organic solvent, which is the same as or different from said first organic solvent, to obtain a rubber-containing filler dispersion;

(c) introducing said rubber-containing filler dispersion into water having a temperature near the temperature at which said organic solvent distills off and containing a dispersed filler to obtain a mixture which is subjected to high shear forces causing at least a part of said organic solvent to distill off;

(d) adding an aqueous filler dispersion to obtain a precipitated rubber-filler mixture;

(e) removing water from the precipitated rubber filler mixture to obtain a product mixture; and (f) drying the product mixture under constant agitation.

2. The method of claim 1, wherein, concomitant with the introduction of said rubber-containing filler dispersion into hot water, an aqueous, rubber-free filler dispersion is added to said hot water.

3. The method of claim 1, comprising using as said rubber solution a rubber solution obtained by the solution polymerization of a diene or by the solution polymerization of a combination of a diene and a vinyl aromatic compound.

4. The method of claim 1, wherein said rubber solution is a member selected from the group consisting of solutions of polybutadienes, solutions of polyisoprenes, solutions of polymethylpentadienes, solutions of butadiene/styrene copolymers, solutions of butadiene/isoprene copolymers, solutions of isoprene copolymers, solutions of isoprene/styrene copolymers, solutions of butadiene/isoprene/styrene terpolymers, solutions of ethylene/propylene/diene terpolymers, and solutions of polyalkenamers produced by the ring-opening polymerization of cycloolefins.

5. The method of claim 1, comprising using as said first organic solvent or as said second organic solvent at least one member selected from the group consisting of aliphatic, alicyclic, and aromatic hydrocarbon solvents having a boiling point of less than 100° C.

6. The method of claim 1, comprising using as said first organic solvent or as said second organic solvent at least one member selected from the group consisting of pentane, hexane, heptane, cyclohexane, benzene and toluene.

7. The method of claim 1, comprising using a rubber solution having a solids content of from 5 to 25 wt. %.

8. The method of claim 1, wherein said filler is a carbon black or a mineral substance.

9. The method of claim 1, wherein said filler is present in an amount of from 30 to 300 parts by weight per 100 parts by weight of rubber in the rubber-filler mixture.

10. The method of claim 1, wherein said filler is present in an amount of from 50 to 150 parts by weight per 100 parts by weight of rubber in the rubber-filler mixture.

11. The method of claim 1, comprising combining said dispersion with said rubber solution in an amount appropriate to obtain 2 to 30 wt. % rubber in the rubber-containing filler dispersion.

12. The method of claim 1, comprising combining said dispersion with said rubber solution in an amount appropriate to obtain 5 to 13 wt. % of rubber in said rubber-containing filler dispersion.

13. The method of claim 1, comprising subjecting said mixture to high shear forces for a period of up to 20 minutes at a temperature above the boiling points of said organic solvents.

14. The method of claim 1, wherein, after said aqueous filler dispersion is added, the solution is cooled to a temperature of from 20° to 30° C. and water is removed from the rubber-filler mixture by filtration.

* * * * *